US009676907B2

(12) United States Patent
Spevacek et al.

(10) Patent No.: US 9,676,907 B2
(45) Date of Patent: Jun. 13, 2017

(54) METHODS AND SYSTEMS OF GRAFT POLYMERIZATION ON A FUNCTIONALIZED SUBSTRATE

(71) Applicant: ASPEN RESEARCH CORPORATION, Maple Grove, MN (US)

(72) Inventors: John A. Spevacek, Woodbury, MN (US); Roger Pearson, Minneapolis, MN (US); Kenneth W. Richards, Plymouth, MN (US); Kenneth D. Zigrino, Eden Prairie, MN (US)

(73) Assignee: Aspen Research Corporation, Maple Grove, MN (US)

(*) Notice: Subject to any disclaimer, the term of this patent is extended or adjusted under 35 U.S.C. 154(b) by 0 days.

(21) Appl. No.: 15/009,373

(22) Filed: Jan. 28, 2016

(65) Prior Publication Data
US 2016/0168331 A1 Jun. 16, 2016

Related U.S. Application Data

(63) Continuation of application No. 14/342,213, filed as application No. PCT/US2012/053475 on Aug. 31, 2012, now Pat. No. 9,267,009.

(60) Provisional application No. 61/530,012, filed on Sep. 1, 2011.

(51) Int. Cl.
| *C08F 273/00* | (2006.01) |
| *C08G 75/045* | (2016.01) |
| *C08J 7/16* | (2006.01) |
| *C08H 1/00* | (2006.01) |
| *C08G 63/688* | (2006.01) |
| *C08J 7/18* | (2006.01) |
| C08L 89/00 | (2006.01) |
| C08F 220/06 | (2006.01) |

(52) U.S. Cl.
CPC .......... *C08G 75/045* (2013.01); *C08F 273/00* (2013.01); *C08G 63/688* (2013.01); *C08H 1/00* (2013.01); *C08J 7/16* (2013.01); *C08J 7/18* (2013.01); *C08F 220/06* (2013.01); *C08L 89/00* (2013.01)

(58) Field of Classification Search
CPC .......... C08F 273/00; C08J 7/18; C08L 89/00; C08H 1/06
See application file for complete search history.

(56) References Cited

U.S. PATENT DOCUMENTS

| 3,642,498 | A | 2/1972 | Anker |
| 5,207,941 | A * | 5/1993 | Kroner .................. C08F 289/00 |
| | | | 106/154.11 |
| 5,639,582 | A * | 6/1997 | Imai .................. G03G 9/08773 |
| | | | 430/108.3 |
| 5,654,368 | A | 8/1997 | Nakano et al. |
| 6,884,842 | B2 | 4/2005 | Soane et al. |
| 6,916,909 | B1 | 7/2005 | Nicolas et al. |
| 7,066,995 | B1 | 6/2006 | Barone et al. |
| 7,671,258 | B2 | 3/2010 | Zhang et al. |
| 9,074,056 | B2 * | 7/2015 | Spevacek .................. C08J 7/16 |
| 9,267,009 | B2 * | 2/2016 | Spevacek .................. C08J 7/16 |
| 2003/0119089 | A1 | 6/2003 | Van Dyke |
| 2010/0069612 | A1 | 3/2010 | Umeda et al. |
| 2010/0144902 | A1 | 6/2010 | Shu |

FOREIGN PATENT DOCUMENTS

| JP | 54-137064 | 10/1979 |
| JP | 05-285374 | 11/1993 |
| JP | 06-336499 | 12/1994 |
| WO | 91 02767 | * 3/1991 |

OTHER PUBLICATIONS

E. Jin et al., "Graft Polymerization of Native Chicken Feathers for Thermoplastic Applications," Journal of Agricultural and Food Chemistry, vol. 59 (2001), p. 1729-1738.
International Search Report and Written Opinion for international application No. PCT/US2012/053475, dated Jan. 29, 2013 (6 pages).
International Search Report and Written Opinion for international application No. PCT/US2012/053483, dated Jan. 29, 2013 (6 pages).

* cited by examiner

*Primary Examiner* — Kuo-Liang Peng
(74) *Attorney, Agent, or Firm* — Hamre, Schumann, Mueller & Larson, P.C.

(57) ABSTRACT

Graft polymerization is fulfilled on a functionalized substrate. The functionalized substrate is prepared from a disulfide bond-containing feedstock and has been prepared for polymerization through the introduction of one or more polyfunctional monomers containing a disulfide bond breaking material functional group.

9 Claims, 6 Drawing Sheets

METHODS AND SYSTEMS OF GRAFT POLYMERIZATION ON A FUNCTIONALIZED SUBSTRATE

PRIORITY DATA

This application claims the benefit of U.S. Provisional Patent Application Ser. No. 61/530,012 entitled "METHODS AND SYSTEMS OF GRAFT POLYMERIZATION ON A FUNCTIONALIZED SUBSTRATE," filed on Sep. 1, 2011, and U.S. Provisional Patent Application Ser. No. 61/530,016 entitled "METHODS AND SYSTEMS TO PREPARE FUNCTIONALIZED SUBSTRATE FROM DISULFIDE BOND-CONTAINING MATERIAL," filed on Sep. 1, 2011, both of which are incorporated by reference in its entirety.

FIELD

This disclosure relates generally to graft polymerization, and more specifically to graft polymerization on a functionalized substrate made from materials containing disulfide bonds.

BACKGROUND

Petroleum is currently the primary chemical feedstock for the production of polymers. This commodity is becoming more expensive, impacting the cost of plastic materials and ultimately end-products. Petroleum is a non-sustainable material and is subject to geopolitical and environmental forces that further impact cost and future availability. Therefore, an alternative source of chemical feedstock for the production of polymers is desirable, one that is not subject to geopolitical and environmental influences that impact availability, price, and the environment.

Feathers, such as poultry feathers, composed of approximately 90% keratin, are a plentiful and readily-available byproduct in the food processing industry, with most of the material being disposed of as waste. Previous documented efforts using poultry feathers as a chemical feedstock have used water-based or other solvent-based techniques. In one instance chicken feathers were dispersed in water prior to polymerization (Graft Polymerization of Native Chicken Feathers for Thermoplastic Applications, Enqi Jin, et al, J. Agric. Food Chem. 2011, 59, 1729-1738). In other instances the feathers were degraded with harsh chemicals and then used as a substrate for further polymerizations (U.S. Pat. No. 3,642,498 "Keratin protein product and process of preparing same"). Regardless, in all cases, at the completion of the reaction, the water, solvents or other chemicals needed to be removed. Other art includes treating natural keratin with OH containing plasticizer allowing the protein to be pressed into films at typical polymer processing temperatures (Composition and Films Comprised of Avian Feather Keratin, U.S. Pat. No. 7,066,995 B1).

Other documented efforts include the use of bi-functional thiols, such as β-mercaptoethanol, to break the disulfide bonds found in feathers, keratin and other materials containing disulfide bonds, for the purpose of extracting the keratin.

SUMMARY

Methods and systems are described herein for graft polymerization on a functionalized substrate. The functionalized substrate is prepared from a disulfide bond-containing feedstock and has been prepared for polymerization through the introduction of one or more polyfunctional monomers containing a disulfide bond breaking material.

In one embodiment, a process of graft polymerization to generate a graft polymerization composition, is provided. The process includes introducing a disulfide-bond-containing material to a polyfunctional monomer. The disulfide-bond-containing material includes a disulfide bond connecting a first portion and a second portion. The polyfunctional monomer includes at least one first functional group and at least one second functional group. The first functional group includes a disulfide bond breaking material for breaking the disulfide bond and forming a second bond between the first portion and the polyfunctional monomer. The second functional group includes a thiol group. The process further includes introducing an ene monomer to the disulfide-bond-containing material and a polyfunctional monomer to form a mixture, and initiating a thiol-ene polymerization reaction of the mixture.

In another embodiment, a graft polymer composition is provide. The composition includes a substrate and a thiol-ene polymer. The substrate and the thiol-ene polymer are bonded via a disulfide-bond. The substrate includes a disulfide-bond-containing material. The disulfide-bond-containing material includes a disulfide bond connecting a first portion and a second portion. The thiol-ene polymer includes a polyfunctional monomer and an ene monomer. The polyfunctional monomer includes at least one first functional group and at least one second functional group. The first functional group includes a disulfide bond breaking material, and the second functional group includes a thiol group configured to react with the ene monomer.

In the embodiments described herein the functionalized substrate is prepared for graft polymerization through the introduction of one or more polyfunctional monomers, at least one functional group that includes a disulfide bond breaking material (for example, a thiol (—SH) group), to a feedstock comprising or containing for example, protein, peptides or other materials that include disulfide bonds. The polyfunctional monomer includes at least two functional groups, of which a first functional group is a disulfide bond breaking group (e.g., thiol (—SH) group) that is used to break the disulfide (S—S) bond between cysteine residues that crosslink the feedstock and to reform a disulfide bond between one of the cysteine residues of the feedstock and the attacking thiol (—SH) or other disulfide bond breaking group. The other functional group(s) of the polyfunctional monomer can depend upon the type of polymer to be produced. The other functional group(s) can include, but are not limited to, acid anhydrides, acyl halides, alcohols, aldehydes, alkenes, alkynes, amines, carboxylic acids, esters and thiols.

In some embodiments, a polyfunctional monomer includes at least one first functional group and at least one second functional group. The first functional group includes a disulfide bond breaking material for breaking the disulfide bond and forming a second bond between the first portion and the polyfunctional monomer. The second functional group includes a thiol group. The second functional group can also include at least one ring, and the ring is adapted to be opened to form at least a third functional group.

In some embodiments, additional monomers may be added to the aforementioned disulfide bond-containing feedstock before, with, or after the addition of the polyfunctional monomer containing the disulfide bond breaking group. The number and composition of the additional monomers can vary as required for the production of the polymer to be produced.

In some embodiments, an ene monomer can be added to the feedstock along with the polyfunctional monomer containing the disulfide bond breaking group such as, for example, a thiol group. The term "ene" or "ene monomer" used herein refers to an ethylenically unsaturated functional group, or a monomer with ethylenically unsaturated functional group(s).

In some embodiments, the molar ratio of the thiol group and the ene monomer is not greater than 1:1. The thiol group includes the thiol group of the first functional group and the thiol group of the second functional group.

In some embodiments, a second polymerization reaction is initiated to a graft polymerization composition that includes a substrate and a thil-ene polymer. The substrate and the thiol-ene polymer are bonded via a disulfide-bond.

In some embodiments, UV light or thermal initiators can be used for the generation of free-radicals to initiate the polymerization reaction, while in other embodiments, catalysts may be used (with or without heat) to initiate the polymerization reaction.

In some embodiments, polymerization may also be self-initiated by one of the monomers used in the graft polymerization process. A third monomer or macromer can be introduced to a graft polymerization composition to initiate a second polymerization reaction.

In some embodiments, the graft polymerization can be a solids graft polymerization that does not require the use of water or aqueous or non-aqueous solvents at any point in the process. In other embodiments, graft polymerization may use water or aqueous or non-aqueous solvents, at one or more points in the process, as required for the production of the polymer to be produced or for other chemical or physical purposes, for example softening the feathers in preparation for the described process or placing the target polymer in solution for shipping. The use of a solids graft polymerization process provides a less restrictive chemistry, because it does not require the use of water-soluble monomers and enables the production of the widest possible range of polymers from the protein or other disulfide bond-containing substrate. A solids graft polymerization process is also more efficient and ecologically friendly since it does not require any water or solvents as an input, and does not require the filtration/heating step(s) involved in removal of the water or solvents, unless water is generated as a byproduct of the polymerization reaction.

In the embodiments described herein, polyfunctional monomer(s) including at least one functional group that is a thiol (—SH) or other disulfide bond breaking material are used to break the disulfide bonds for preparing the keratin or other disulfide bond-containing material for graft polymerization. Hence, these embodiments are more efficient and targeted, with the processes and reactants involved being chosen to prepare a substrate for specific graft polymerization outcomes.

Additionally, if the disulfide bond-containing feedstock, such as keratin, is biodegradable, then by judicious choice of the monomers used in the described embodiments, the polymer produced can be made biodegradable.

In another embodiment, various waste materials, including for example, avian feathers, hair, wool and/or vulcanized rubber, may be used as a feedstock for the method and process described herein.

In another embodiment, the method and process described herein can be used for the production of plastics, coatings, form insulation, adhesives and other polymers.

While the embodiments described herein can use proteins, peptides, or any material containing disulfide bonds, for purposes of this disclosure the protein keratin is used by example as the chemical feedstock for the production of polymers. Keratin is a sustainable chemical feedstock that can be found in avian feathers, hair, wool and other sources, and is biodegradable.

An advantage of using feathers, such as poultry feathers, is that they can provide a sustainable chemical feedstock for production of polymers and can replace many of the petroleum-based polymers at a fraction of the cost and remove a waste material from the environment. Keratin is environmentally friendly as it is biodegradable and by judicious choice of the monomers, the entire product may be biodegradable, an attribute increasingly sought after in the industry.

There is a substantial need for the embodiments described herein because it will help reduce the current dependence on ever-more-costly and environmentally-unfriendly petroleum as the principal feedstock for polymers. The embodiments described herein can use waste products (for example, avian feathers) as an alternative, less costly and more environmentally-friendly feedstock for the production of plastics, coatings, adhesives and other polymers and can replace many petroleum-based feedstocks. Moreover the use of such waste streams may make the resulting materials biodegradable, as keratin and other feedstocks are themselves biodegradable. Finally, the embodiments described herein can eliminate the odor produced when utilizing avian feathers in polymers and can result in the creation of many new materials with new characteristics.

Cysteine residue

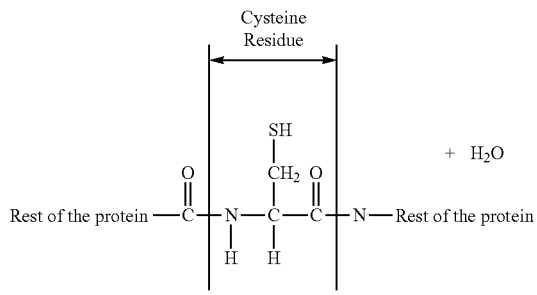

(as illustrated above between the vertical dashed lines), is the fragment of the cysteine amino acid after it has been incorporated into the protein, however missing the $H_2O$. In proteins, two thiol groups from two cysteine residues may form a sulfur-sulfur bond (a disulfide bond) crosslinking the protein. The existing disulfide bond can be broken and a new one can be formed between one of the cysteine residues and the attacking thiol or other disulfide bond breaking material. The other cysteine residue is converted to a thiol. In other embodiments, the other cysteine residue can be converted to other chemical compositions. In one embodiment, a protein, peptide or other material containing disulfide bonds is mixed with polyfunctional monomer(s) ($M^1$) with the generic structure

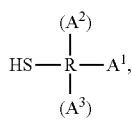

where one functional group, HS, is a thiol group, R is a generic hydrocarbon, $A^1$ is another functional group, and $A^2$ and $A^3$ are optional functional groups. These functional groups that make up $A^1$, $A^2$, and $A^3$ can be taken from the standard lists of organic functional groups and include acid anhydrides, acyl halides, alcohols, aldehydes, alkenes, alkynes, amines, carboxylic acids, esters and thiols, as well as additional functional groups known in the arts. $A^1$, $A^2$ and $A^3$ do not have to be the same functional group. The thiol groups in the polyfunctional monomer $M^1$ break the disulfide bonds as described above and reform as new disulfide bonds between the cysteine residue and the polyfunctional monomer $M^1$. The unreacted functional groups, for example, $A^1$, $A^2$ and $A^3$, and additional monomers can then be used as reactants to prepare polymers through graft polymerization. The polyfunctional monomer(s) is not limited to having three functional groups in addition to the disulfide bond breaking functional group, but may have any number of additional functional groups ($A''$). Multiple and different $M^1$(s) can be used as desired. By example only the following is a partial list of $M^1$ polyfunctional monomers containing a thiol group:

| Examples of Polyfunctional Monomers with at least 1 Thiol, M1 |
|---|
| Ethanedithiol |
| Propanedithiol |
| Butanedithiol |
| Pentanedithiol |
| Hexanedithiol |
| Propanetrithiol |
| Butanetrithiol |
| Pentanetrithiol |
| Hexanetrithiol |
| Butanetetrathiol |
| Pentanetetrathiol |
| Hexanetetrathiol |
| Hydroxy-ethanedithiol |
| Hydroxy-propanedithiol |
| Hydroxy-butanedithiol |
| Hydroxy-pentanedithiol |
| Hydroxy-hexanedithiol |
| Dihydroxy-ethanethiol |
| Dihydroxy-propanethiol |
| Dihydroxy-butanethiol |
| Dihydroxy-pentanethiol |
| Dihydroxy-hexanethiol |
| Hydroxy-pentanetrithiol |
| Hydroxy-hexanetrithiol |
| Dihydroxy-pentanedithiol |
| Dihydroxy-hexanedithiol |
| Trihydroxy-pentanethiol |
| Trihydroxy-hexanethiol |
| Hydroxy-pentanetetrathiol |
| Hydroxy-hexanetetrathiol |
| Dihydroxy-pentanetrithiol |
| Dihydroxy-hexanetrithiol |
| Trihydroxy-pentanedithiol |
| Trihydroxy-hexanedithiol |
| Tetrahydroxy-pentanethiol |
| Tetrahydroxy-hexanethiol |
| Mercaptoethyl ether |
| Mercaptopropyl ether |
| Mercaptobutyl ether |
| Mercaptopentyl ether |
| Mercaptoacetic acid |
| Mercaptopropionic acid |

| Examples of Polyfunctional Monomers with at least 1 Thiol, M1 |
|---|
| Mercaptobutyric acid |
| Mercaptovaleric acid |
| 2,2'-(Ethylenedioxy)diethanethiol |
| 3-Mercaptopropyl methyldimethoxysilane |
| 2-Mercaptopropyltrimethoxysilane |
| Trimethylolpropane tris(2-mercaptoacetate) |
| Trimethylolpropane tris(2-mercaptopropionate) |
| Pentaerythritol tetrakis(2-mercaptoacetate) |
| Pentaerythritol tetrakis(2-mercaptopropionate) |

Following or concurrent with, or even before the reformation of the disulfide bonds, monomer $M^2$ is added to the mixture. The number and composition of the functional groups for the monomer $M^2$ chosen for the polymerization can depend on the number and composition of the $M^1$ functional groups used ($A^1$, $A^2$, to $A''$). For instance, if an A group (for example, $A^1$, $A^2$ or $A^3$) is a carboxylic acid, $M^2$ can have either amine or alcohol functional groups to form polyamides or polyesters respectively. Similarly, if an A group (for example, $A^1$, $A^2$ or $A^3$) is an aldehyde, $M^2$ can have an acid anhydride in order to form an alkyd polymer. The monomer $M^2$ may be at least bi-functional in order for efficient polymerization to occur. However, multiple and different $M^2$(s) can be used as desired. Some of these additional $M^2$ monomers may be monofunctional in order to provide chain length control. By example only, the following is a partial list of $M^2$ monomers:

| Examples of Monomers M2 |
|---|
| Acrylic acid |
| Methacrylic acid |
| Methyl acrylate |
| Methyl methacrylate |
| Ethylacrylic acid |
| Ethyl acrylate |
| Ethyl ethylacrylate |
| Methyl ethylacrylate |
| Ethyl methylacrylate |
| Butyl acrylate |
| Hexylacrylate |
| Iso-octyl acrylate |
| 2-Ethylhexyl amylate |
| Glycidal acrylate |
| Glycidal methacrylate |
| Glycidal neodecanate |
| Triallylisocyanurate |
| Diethylene glycol divinyl ether |
| Triethylene glycol divinyl ether |
| Acrylamide |
| Allylamine |
| N-Methylallylamine |
| N-Ethyl-2-methylallylamine |
| Diallylamine |
| Triallylamine |
| Tris(2-methylallyl)amine |
| N-Allylcyclopentylamine |
| N-Allylcyclohexylamine |
| Ethanolamine |
| 3-Amine-1-propanol |
| 4-Amine-1-butanol |
| 3-Amino-1,2-propanediol |
| 1,3-Diamino-2-hydroxypropane |
| 1,2-Phenyldiamine |
| 1,3-Phenyldiamine |
| 1,4-Phenyldiamine |
| 2,3-Diaminotoluene |
| 2,4-Diaminotoluene |
| 2,5-Diaminotoluene |
| 2,6-Diaminotoluene |
| 3,5-Diaminotoluene |

| Examples of Monomers M² |
| --- |
| Benzidine |
| 1,2-Diaminonapthalene |
| 1,3-Diaminonapthalene |
| 1,4-Diaminonapthalene |
| 1,5-Diaminonapthalene |
| 1,6-Diaminonapthalene |
| 1,7-Diaminonapthalene |
| 1,8-Diaminonapthalene |
| 2,3-Diaminonapthalene |
| 2,5-Diaminonapthalene |
| 2,6-Diaminonapthalene |
| 2,7-Diaminonapthalene |
| 1,2-Diaminoanthracene |
| 1,3-Diaminoanthracene |
| 1,4-Diaminoanthracene |
| 1,5-Diaminoanthracene |
| 1,6-Diaminoanthracene |
| 1,7-Diaminoanthracene |
| 1,8-Diaminoanthracene |
| 1,9-Diaminoanthracene |
| 1,10-Diaminoanthracene |
| 2,3-Diaminoanthracene |
| 2,4-Diaminoanthracene |
| 2,5-Diaminoanthracene |
| 2,6-Diaminoanthracene |
| 2,7-Diaminoanthracene |
| 2,8-Diaminoanthracene |
| 2,9-Diaminoanthracene |
| 2,10-Diaminoanthracene |
| 9,10-Diaminoanthracene |
| 1,2-Diaminophenanthrene |
| 1,3-Diaminophenanthrene |
| 1,4-Diaminophenanthrene |
| 1,5-Diaminophenanthrene |
| 1,6-Diaminophenanthrene |
| 1,7-Diaminophenanthrene |
| 1,8-Diaminophenanthrene |
| 1,9-Diaminophenanthrene |
| 1,10-Diaminophenanthrene |
| 2,3-Diaminophenanthrene |
| 2,4-Diaminophenanthrene |
| 2,5-Diaminophenanthrene |
| 2,6-Diaminophenanthrene |
| 2,7-Diaminophenanthrene |
| 2,8-Diaminophenanthrene |
| 2,9-Diaminophenanthrene |
| 2,10-Diaminophenanthrene |
| 3,4-Diaminophenanthrene |
| 3,5-Diaminophenanthrene |
| 3,6-Diaminophenanthrene |
| 3,9-Diaminophenanthrene |
| 3,10-Diaminophenanthrene |
| 4,5-Diaminophenanthrene |
| 4,9-Diaminophenanthrene |
| 4,10-Diaminophenanthrene |
| 9,10-Diaminophenanthrene |
| 2-Aminophenol |
| 3-Aminophenol |
| 4-Aminophenol |
| 2-Aminothiophenol |
| 3-Aminothiophenol |
| 4-Aminothiophenol |
| 2-Aminophenyl ether |
| 3-Aminophenyl ether |
| 4-Aminophenyl ether |
| 2-Amino-m-cresol |
| 4-Amino-m-cresol |
| 5-Amino-m-cresol |
| 2-Amino-p-cresol |
| 3-Amino-p-cresol |
| 2-Amino-o-cresol |
| 3-Amino-o-cresol |
| 4-Amino-o-cresol |
| 5-Amino-o-cresol |
| 2,3-Diaminophenol |
| 2,4-Diaminophenol |
| 2,5-Diaminophenol |
| 2,6-Diaminophenol |
| 3,4-Diaminophenol |
| 3,5-Diaminophenol |
| 1,2-Dihydroxynapthalene |
| 1,3-Dihydroxynapthalene |
| 1,4-Dihydroxynapthalene |
| 1,5-Dihydroxynapthalene |
| 1,6-Dihydroxynapthalene |
| 1,7-Dihydroxynapthalene |
| 1,8-Dihydroxynapthalene |
| 2,3-Dihydroxynapthalene |
| 2,5-Dihydroxynapthalene |
| 2,6-Dihydroxynapthalene |
| 2,7-Dihydroxynapthalene |
| 1,2-Dihydroxyanthracene |
| 1,3-Dihydroxyanthracene |
| 1,4-Dihydroxyanthracene |
| 1,5-Dihydroxyanthracene |
| 1,6-Dihydroxyanthracene |
| 1,7-Dihydroxyanthracene |
| 1,8-Dihydroxyanthracene |
| 1,9-Dihydroxyanthracene |
| 1,10-Dihydroxyanthracene |
| 2,3-Dihydroxyanthracene |
| 2,4-Dihydroxyanthracene |
| 2,5-Dihydroxyanthracene |
| 2,6-Dihydroxyanthracene |
| 2,7-Dihydroxyanthracene |
| 2,8-Dihydroxyanthracene |
| 2,9-Dihydroxyanthracene |
| 2,10-Dihydroxyanthracene |
| 9,10-Dihydroxyanthracene |
| 1,2-Dihydroxyphenanthrene |
| 1,3-Dihydroxyphenanthrene |
| 1,4-Dihydroxyphenanthrene |
| 1,5-Dihydroxyphenanthrene |
| 1,6-Dihydroxyphenanthrene |
| 1,7-Dihydroxyphenanthrene |
| 1,8-Dihydroxyphenanthrene |
| 1,9-Dihydroxyphenanthrene |
| 1,10-Dihydroxyphenanthrene |
| 2,3-Dihydroxyphenanthrene |
| 2,4-Dihydroxyphenanthrene |
| 2,5-Dihydroxyphenanthrene |
| 2,6-Dihydroxyphenanthrene |
| 2,7-Dihydroxyphenanthrene |
| 2,8-Dihydroxyphenanthrene |
| 2,9-Dihydroxyphenanthrene |
| 2,10-Dihydroxyphenanthrene |
| 3,4-Dihydroxyphenanthrene |
| 3,5-Dihydroxyphenanthrene |
| 3,6-Dihydroxyphenanthrene |
| 3,9-Dihydroxyphenanthrene |
| 3,10-Dihydroxyphenanthrene |
| 4,5-Dihydroxyphenanthrene |
| 4,9-Dihydroxyphenanthrene |
| 4,10-Dihydroxyphenanthrene |
| 9,10-Dihydroxyphenanthrene |
| 1,2-Diphenylethylenediamine |
| 2-Phenylglycinol |
| m-Xylenediamine |
| o-Xylenediamine |
| p-Xylenediamine |
| 2-Aminobenzylamine |
| 3-Aminobenzylamine |
| 4-Aminobenzylamine |
| 2-(2-Aminophenyl)ethylamine |
| 2-(3-Aminophenyl)ethylamine |
| 2-(4-Aminophenyl)ethylamine |
| Tyramine |
| Ethylene glycol |
| Diethylene glycol |
| Triethylene glycol |
| Propylene glycol |
| Dipropylene glycol |
| Tripropylene glycol |
| 1,2-Epoxy-4-Butene |

Examples of Monomers M²

1,2-Epoxy-5-Hexene
1,2-Epoxy-6-Heptene
Succinic anhydride
Maleic anhydride
Diglycolic anhydride
1,4-Butanediisocyanate
1,5-Pentanediisocyanate
1,6-Hexanediisocyanate
Isophorone diisocyanate
1,4-Cyclohexane diisocyanate
1,4-Butanediisothiocyanate
1,5-Pentanediisothiocyanate
1,6-Hexanediisothiocyanate
1,4-Cyclohexane diisothiocyanate
1,2-Phenylenediisocyanate
1,3-Phenylenediisocyanate
1,4-Phenylenediisocyanate
Tolylene 2,3-diisocyanate
Tolylene 2,2-diisocyanate
Tolylene 2,5-diisocyanate
Tolylene 2,6-diisocyanate
1,2-Phenylenediisothiocyanate
1,3-Phenylenediisothiocyanate
1,4-Phenylenediisothiocyanate
Tolylene 2,3-diisothiocyanate
Tolylene 2,2-diisothiocyanate
Tolylene 2,5-diisothiocyanate
Tolylene 2,6-diisothiocyanate
Methyl vinyl ether
Ethyl vinyl ether
Butyl vinyl ether
Isobutyl vinyl ether
Allyl ethyl ether
Allyl propyl ether
Allyl butyl ether
Allyl ether
1-Pentene
1-Hexene
1-Heptene
1-Octene
Isoprene
1,3-Pentadiene
1,4-Pentadiene
1,5-Pentadiene
1,3-Hexadiene
1,4-Hexadiene
1,5-Hexadiene
1,6-Hexadiene
Oxalic acid
Malonic acid
Succinic acid
Glutaric acid
Butyric acid
Adipic acid
Phthalic acid
Isophthalic acid
Terephthalic acid
Glycolic acid
Lactic acid
Malic acid
Tartaric acid
Citric acid
Mandelic acid
γ-Butyrolactone
Lactide In some embodiments, UV light or thermal initiators can be used for the generation of free-radicals to initiate the polymerization reaction, while in other embodiments, catalysts may be used (with or without heat) to initiate the polymerization reaction. In some embodiments, the addition of the M² monomer(s) can initiate polymerization.

In one embodiment, the graft polymerization process incorporates a method to functionalize a disulfide bond-containing feedstock through the addition of polyfunctional monomer(s) M¹, having at least two functional groups, of which at least one functional group is a thiol that is used to break the disulfide bond (S—S) on the cysteine residues that crosslink the protein and reform a new disulfide bond between one of the cysteine residues and the attacking thiol.

In one embodiment, the process is a solids graft polymerization, which does not use water or solvents at any point in the process, on a functionalized substrate made from a feedstock containing or comprising protein, peptides or other materials containing disulfide bonds.

In one embodiment, the process can incorporate the addition of polyfunctional monomer(s) M¹, of which at least one functional group is a thiol to break and reform the disulfide bond (S—S), with further additional functional groups that may be incorporated in the polyfunctional monomers, and an initiator that may be heat (optionally with a thermal initiator), UV or visible light (optionally with a photo-initiator), catalyst or any combination of thereof.

In one embodiment, the process incorporates the addition of polyfunctional monomer(s) M¹, of which at least one functional group is a thiol to break and reform the disulfide bond (S—S), with further additional functional groups that may be incorporated, and a monomer M², that when added, can initiate polymerization.

In one embodiment, the process incorporates the addition of polyfunctional monomers M¹, of which at least one functional group is a thiol to break and reform the disulfide bond (S—S), with further additional functional groups that may be incorporated, an additional monomer M², and an initiator that may be, for example, heat (optionally with a thermal initiator), UV or visible light (optionally with a photoinitiator), catalyst or any combination of thereof.

In one embodiment, the process can use water or aqueous solvents on a functionalized substrate or at one or more other points in the process.

In one embodiment, the process can use non-aqueous solvents on a functionalized substrate or at one or more other points in the process.

In one embodiment of the process, one or more different polyfunctional monomers M¹ may be used.

In one embodiment of the process, one or more monomers M² may be used.

In one embodiment of the process, one or more different polymerization reactions may be performed, as by example but not limited hereto, A¹ is a thiol group, A² is a hydroxyl group, and monomer M² consists of two different monomers, the first being a divinyl ether and the second being a diisocyanate which then independently generate, respectively, a thiol-ene polymer and a polyurethane polymer within the same material.

In one embodiment the process may include the addition of stabilizers, as by example but not limited to UV inhibitors, antioxidants, antiozonants, or any other stabilizers.

In one embodiment the process may include the addition of nucleating agents.

In one embodiment the process may include the addition of pigments and/or dyes.

In one embodiment the process may include the addition of plasticizers and/or tackifiers.

In one embodiment the process may include the addition of microbials or antimicrobials, bactericides, and/or nutrients.

In one embodiment the process may include the addition of fillers, as by example but not limited to calcium carbonate, talc, zinc oxide, and any other appropriate filler.

In one embodiment the process may include the addition of a reinforcing agent, for example, nano-tubes, carbon black, plant fibers, fiberglass and/or any other reinforcing agent as deemed appropriate.

DETAILED DESCRIPTION

Figure 1A:
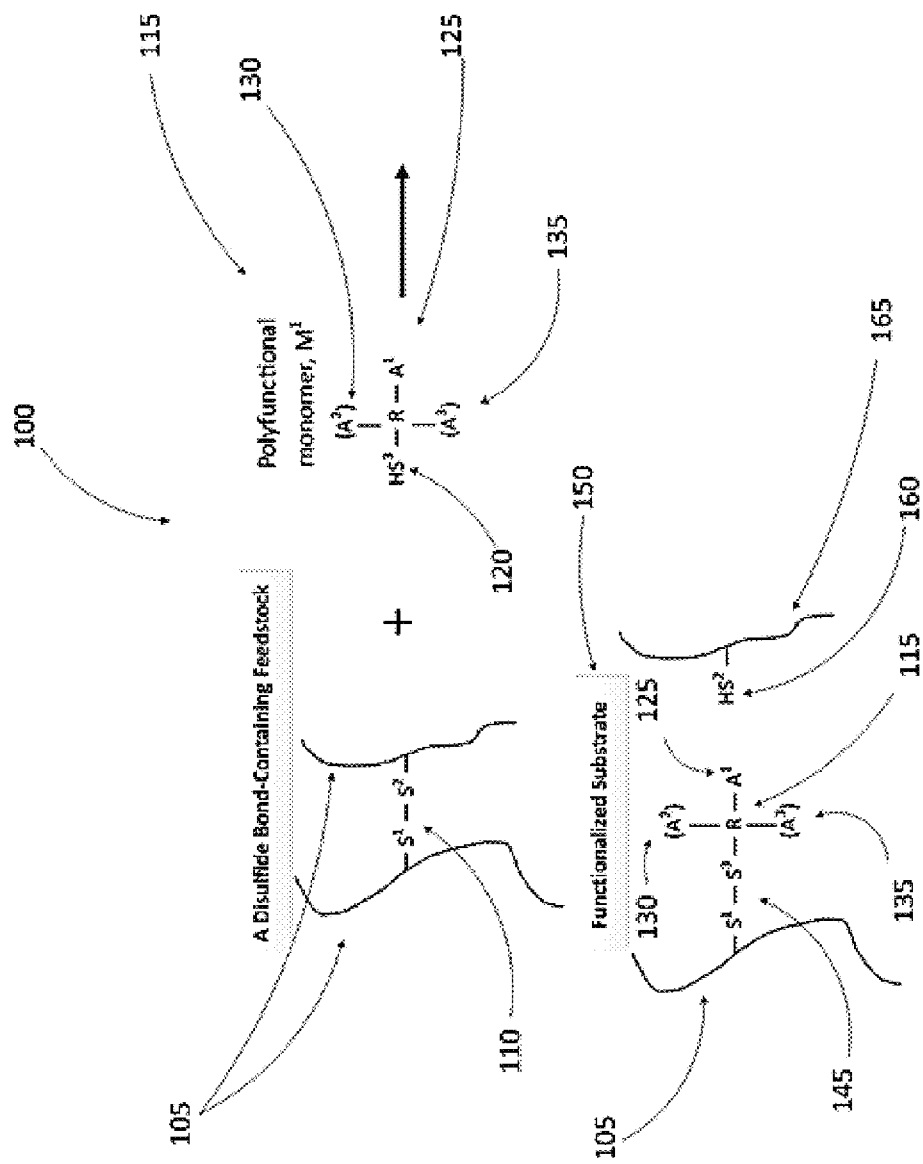
FIG. 1a is an illustration of one embodiment of the functionalization of a disulfide bond-containing feedstock.

In the following detailed description, reference is made to the accompanying drawings, which form a part hereof, and in which are shown, by way of illustration, specific embodiments in which the inventive concepts may be practiced. These embodiments are described in sufficient detail to enable those skilled in the art to practice the described systems and methods, and it is to be understood that the embodiments may be combined or used separately, or that other embodiments may be used, and that design, implementation, and procedural changes may be made without departing from the spirit and scope of the inventive concepts. The following detailed description provides examples.

The terms "feedstock" and "disulfide bond-containing feedstock" may be used interchangeably and are defined as one or more material(s), or combinations thereof, comprising or containing proteins, peptides, or other disulfide bond-containing materials. Such feedstock may be waste stream materials, for example avian feathers, hair, or wool.

The term "functionalized substrate" is defined as a disulfide bond-containing feedstock or components thereof that has been prepared for polymerization through the introduction of one or more polyfunctional monomers, one of the functional groups of which must be a thiol (—SH) or other disulfide bond breaking group, to break the disulfide bonds between the cysteine residues crosslinking the feedstock and reform new disulfide bonds between the cysteine residues of the feedstock and the attacking thiol or other disulfide bond breaking group.

The term "graft polymerization" is defined as a reaction or reactions occurring on a functionalized substrate wherein the polymerization occurs at the functionalization site(s). Note that this definition does not assume or require a particular sequence or timing of events, unless specifically stated.

The term "solids graft polymerization" is defined as a graft polymerization performed without substantial use of water or solvent (whether aqueous or non-aqueous) as a dispersant or for any other purpose. Note that this definition does not preclude the evolution of water or other chemicals as byproducts of the polymerization reaction, and furthermore does not preclude the use of aqueous solutions for preparation of the proteins, peptides, and other disulfide bonded materials for this disclosed process and method.

The term "cysteine residue" is defined as what is left of a cysteine molecule after the cysteine molecule is incorporated within a protein, peptide or other material containing disulfide bonds.

The term "functional group" is defined as a group of atoms found within molecules that are involved in the chemical reactions characteristic of those molecules such as but not limited to acid anhydrides, acyl halides, alcohols, aldehydes, alkenes, alkynes, amines, carboxylic acids, esters and thiols.

The term "solvent(s)" includes water, aqueous solvents and non-aqueous solvents.

The letter "$M^1$" is representative of a polyfunctional monomer containing at least one disulfide bond breaking group and one or more additional functional groups $A^1$, $A^2$, $A^3$, ... and $A^n$ (n is an integer larger than one).

The letter "$M^2$" is representative of a monomer wherein $M^{2-1}$, $M^{2-2}$, ... and $M^{2-n}$ (n is an integer larger than one) refer to different monomers used in a polymerization process.

The letter "S" is representative of a sulfur atom.

The letters "$A^1$, $A^2$, $A^3$, and $A^n$" are representative of functional groups that may or may not be the same.

The letter "R" is representative of a generic hydrocarbon or hydrocarbon chain that may be an alkyl, aromatic, linear, branched or any combination thereof.

Note that in the following illustrations, superscripts do not denote the number of atoms involved (for example $S^1$ or $A^1$), but are simply used to differentiate between atoms or functional groups for purposes of clarity.

Figure 1B:
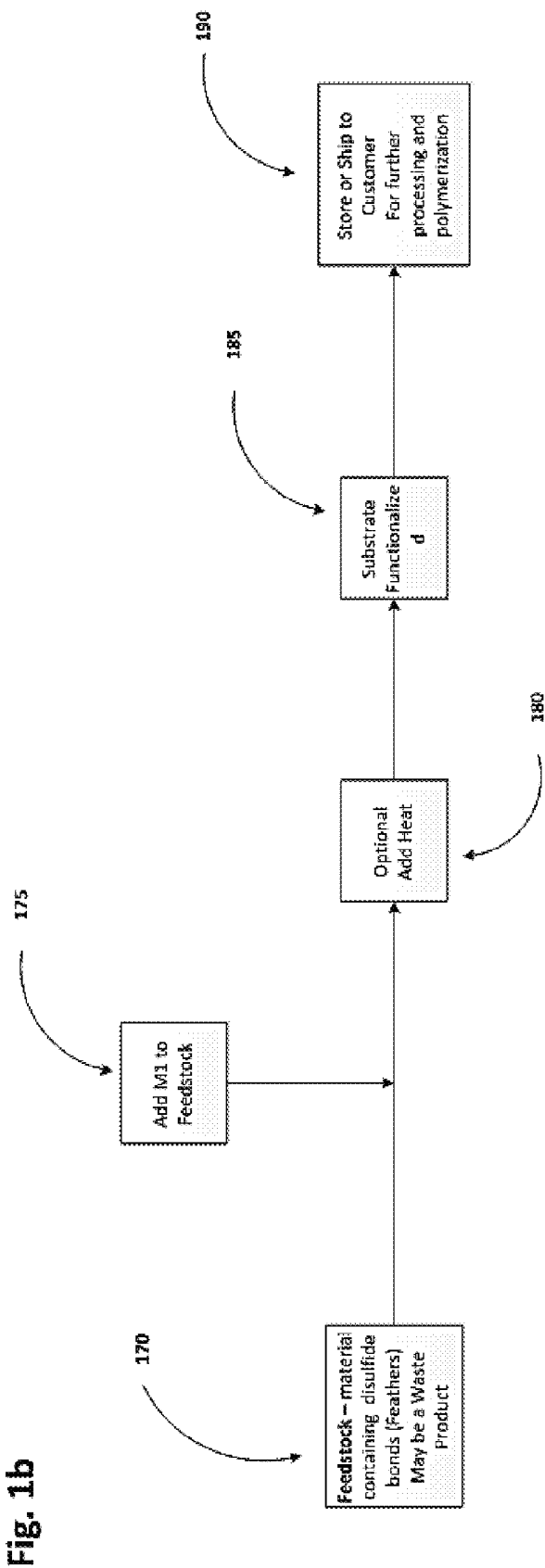
FIG. 1b is an illustration of one embodiment of the process flow of the functionalization of a disulfide bond-containing feedstock.

FIG. 1a and FIG. 1b illustrate an overview and process flow of an exemplary functionalization of a disulfide bond-containing feedstock 100 wherein a polyfunctional monomer 115, 175 is added to the feedstock 105, 170 to break the disulfide bonds 110 between the cysteine residues crosslinking the feedstock 100 and reform new disulfide bonds 145 between one of the cysteine residues of the feedstock and the attacking thiol groups.

In particular, FIG. 1a is an illustration of one embodiment of the functionalization of a disulfide bond-containing feedstock 100 (for example, a protein) through the introduction of a polyfunctional monomer, of which at least one functional group is a disulfide bond breaking group (such as a thiol group) 120, to break the disulfide bonds between the cysteine residues crosslinking the feedstock 100 and reform new disulfide bonds between one of the cysteine residues of the feedstock and the attacking thiol group 145. FIG. 1b is an illustration of one embodiment of the process flow of the functionalization of a disulfide bond-containing feedstock through the introduction of a polyfunctional monomer, of which at least one functional group must be thiol or other disulfide bond breaking material, to break the disulfide bonds between the cysteine residues crosslinking the protein and reform new disulfide bonds between one of the cysteine residues of the feedstock and the attacking thiol or other disulfide bond breaking group.

The disulfide bonds 110 are the bonds between two cysteine residues that are part of and sometimes crosslink proteins, peptides or other materials 105 containing the disulfide bonds 110. As shown in step 170 and 175, at least one polyfunctional monomer $M^1$ 115 including at least one disulfide breaking group 120 (e.g. thiol group) and one $A^1$ functional group 125 and optionally one $A^2$ functional group 130 or two functional groups $A^2$ 130 and $A^3$ 135 respectively may be added.

In accordance with FIG. 1b, the feedstock has been functionalized at step 185 and is stable and the functionalized substrate may be shipped at step 190 to a customer for further processing. Functional groups $A^1$, $A^2$, and $A^3$ may be any functional group of choice dependent upon the target polymer. Furthermore, multiple and different polyfunctional monomers $M^1$ may be added as required dependent upon the polymer to be produced. At step 180, optional heat can be added. Note that this illustration of process and decision flow does not assume or require a particular sequence or timing of events, unless specifically stated.

Upon adding the polyfunctional monomer(s) $M^1$ 115 to the segment 105 of the protein, peptide or other material containing the disulfide bonds 110, the initial reaction is the breaking of the disulfide bond 110 by the disulfide breaking group 120 and reformation of disulfide bond 145 on the segment 105 and formation of a thiol 160 on the segment 165.

Figure 2:
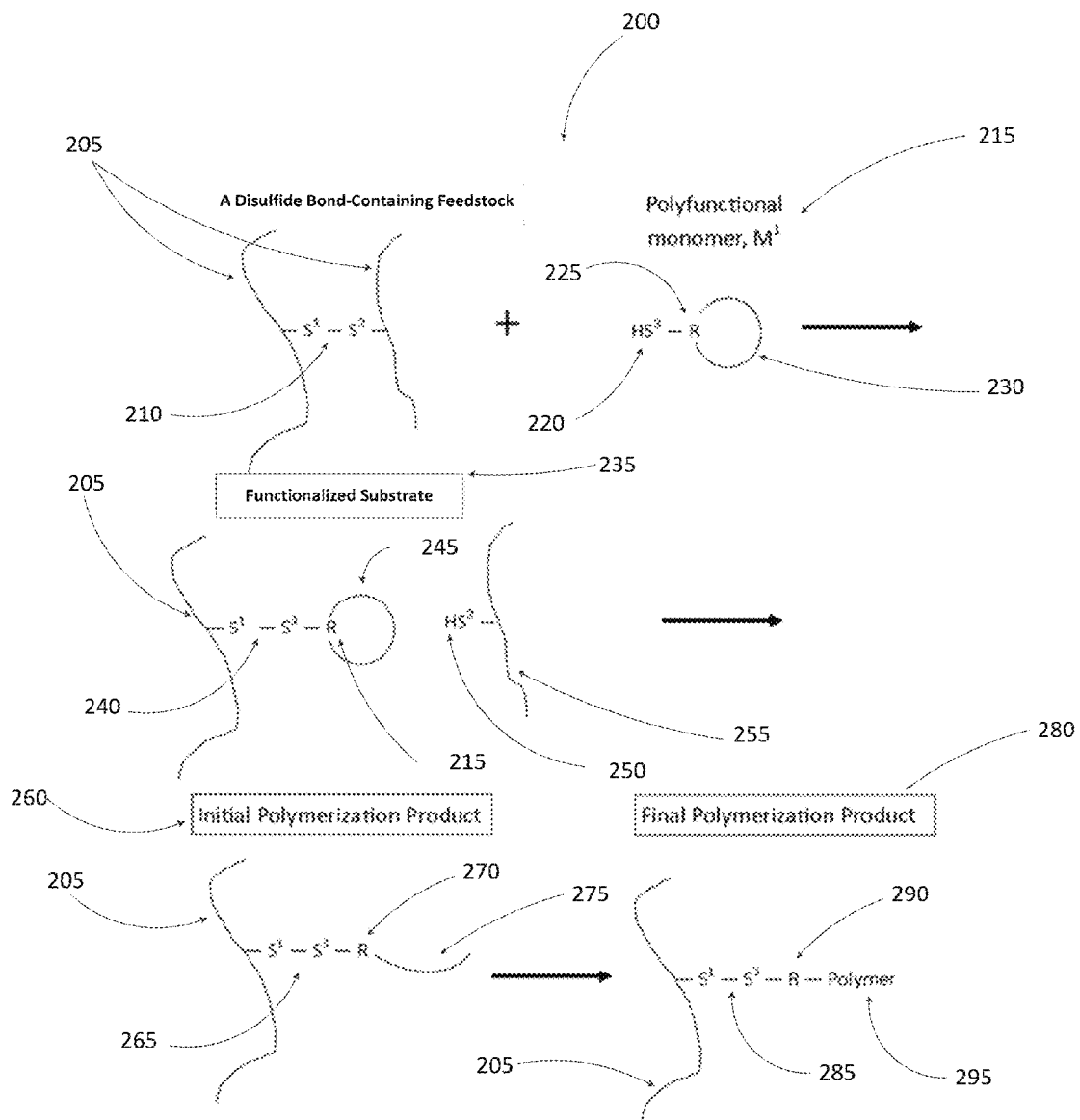
FIG. 2 is an illustration of one embodiment of the graft polymerization on a functionalized substrate, and its polymerization without the addition of $M^2$ monomer(s).

FIG. 2 illustrates an example of graft polymerization 200 on a functionalized substrate. Disulfide bonds 210 are the bonds between two cysteine residues that are part of proteins, peptides or other materials 205 containing disulfide bonds. At least one polyfunctional monomer $M^1$ 215 including at least one thiol group 220 and a ring 230 capable of polymerizing upon opening may be added.

Upon adding polyfunctional monomer(s) $M^1$ 215 to the segment 205 of the protein, peptide or other material containing disulfide bonds, the initial reaction is the breaking of the disulfide bond 210 by the thiol 220 and reformation of the disulfide bond 240 on the segment 205 and formation of thiol 250 on the segment 255.

After the disulfide bond reformation has occurred, appropriate conditions are established to open the ring 230 on the monomer. The opened ring 275 is then capable of reacting with other rings on monomers 215, leading to formation of the grafted polymer 295. Polymerization can be initiated by appropriate means using, for example, heat, UV light, catalyst, etc As one example, the monomer $M^1$ 215 may contain a lactide ring. Upon addition of heat or an appropriate catalyst such as tin (II) chloride, the lactide ring opens and graft polymerization occurs.

Figure 3:
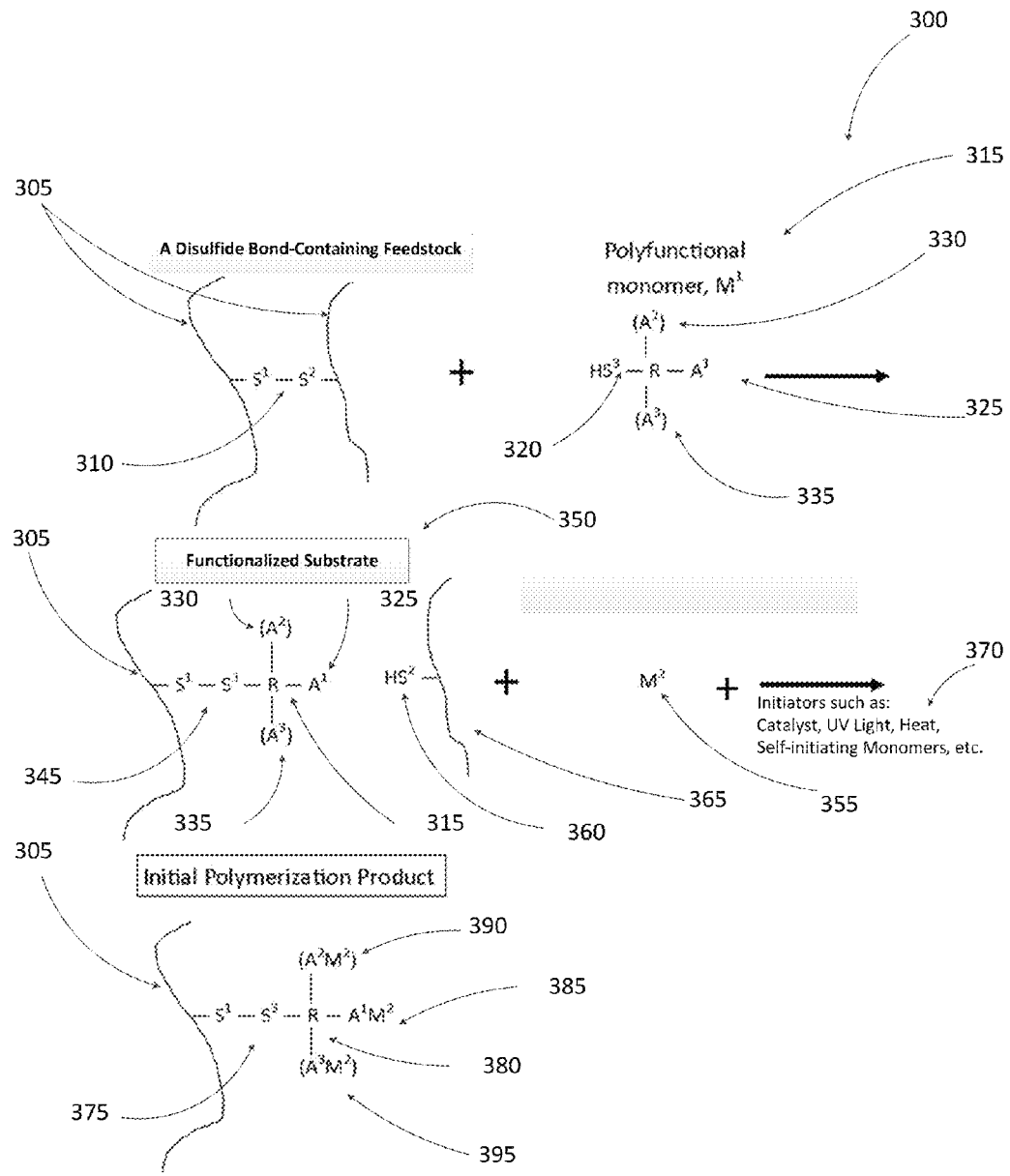
FIG. 3 is an illustration of one embodiment of the overview of a graft polymerization on a functionalized substrate through the introduction of an $M^2$ monomer.

FIG. 3 illustrates an embodiment of the overview of a graft polymerization on a functionalized substrate 300. Disulfide bonds 310 are the bonds between two cysteine residues that are part of proteins, peptides or other materials containing disulfide bonds 305. To break the disulfide bond 310 at least one polyfunctional monomer $M^1$ 315 is used. The polyfunctional $M^1$ 315 can include at least one thiol group 320, one $A^1$ functional group 325 and optionally one $A^2$ functional group 330 or two functional groups $A^2$ 330 and $A^3$ 335 respectively. Functional groups $A^1$, $A^2$, and $A^3$ may be any functional group of choice dependent upon the target polymer. Furthermore, multiple and different polyfunctional monomers $M^1$ 315 may be added as required dependent upon the polymer to be produced. Note that the polyfunctional monomer(s) is not limited to having three functional groups in addition to the disulfide bond breaking functional group, but may have any number of additional functional groups ($A''$).

Upon adding polyfunctional monomer(s) $M^1$ 315 to the segment of the protein, peptide or other material containing disulfide bonds 305 the initial reaction is the breaking of the disulfide bond 310 by the thiol 320 and reformation of the disulfide bond 345 on the segment 305 and formation of thiol 360 on the segment 365. Monomers $M^2$ 355 are added to the initial reaction product 350 and polymerization is initiated by appropriate means such as heat, UV light, catalyst 370 but not limited thereto. The initial propagation step in the polymerization is the addition of monomer $M^2$ 355 to functional groups $A^1$ 325 to form moiety 385, as well as the possible addition to optional functional groups $A^2$ 330 to form moiety 390 and optional functional group $A^3$ 335 to form moiety 395. However, under appropriate conditions addition of monomer $M^2$ will allow the polymerization reaction to occur eliminating the need for an initiator 370. Furthermore, the process may not require the addition of monomer $M^2$ 355 and polymerization is initiated by appropriate means such as heat, UV light, catalyst 370 but not limited thereto. Note that this illustration of process and decision flow does not assume or require a particular sequence or timing of events, unless specifically stated.

In one example, monomer $M^2$ 355 may be poly-enes, of which the polyfunctional monomer $M^1$ 315 contains a thiol functional group $A^1$ 325 to polymerize a thiol-ene polymer. In some embodiments, the molar ratio of the thiol functional group $A^1$ 325 and the ethylenically unsaturated functional group is not greater than 1:1. 0.1623 grams of dried, clean, chopped chicken feathers are massed in a brown vial. To this, 7.5079 grams of 2-, 2'-(ethylenedioxy) diethanethiol are added. The vial is sealed and placed in a 90° C. oven for 24 hours. The vial is then cooled to room temperature before adding 4.7459 grams of acrylic acid and 1.2380 grams of 2-, 4-, 6-trimethyl benzoyl diphenyl phosphine oxide (a UV photoinitiator). The vial is resealed and placed in a 50° C. oven for an hour in order to dissolve the photoinitiator. The vial is cooled to room temperature. The contents are poured onto a sheet of soda float glass and a notch-bar coater is used to prepare a 50 mil thick coating. The coating is then placed under a broad-spectrum UV lamp for about 30 seconds and removed. The coating is cured into a pressure-sensitive adhesive that is tacky.

In another example, the monomer $M^2$ 355 may be a polyol, of which the polyfunctional monomer $M^1$ 315 includes two carboxylic acid groups $A^1$ 325 and $A^2$ 330 to polymerize a polyester polymer. Monomer $M^2$ 355 may be added at the same time as the polyfunctional monomer $M^1$ 315 is added to the protein 305 or may be added after the initial reaction product 350 is formed.

Figure 4:
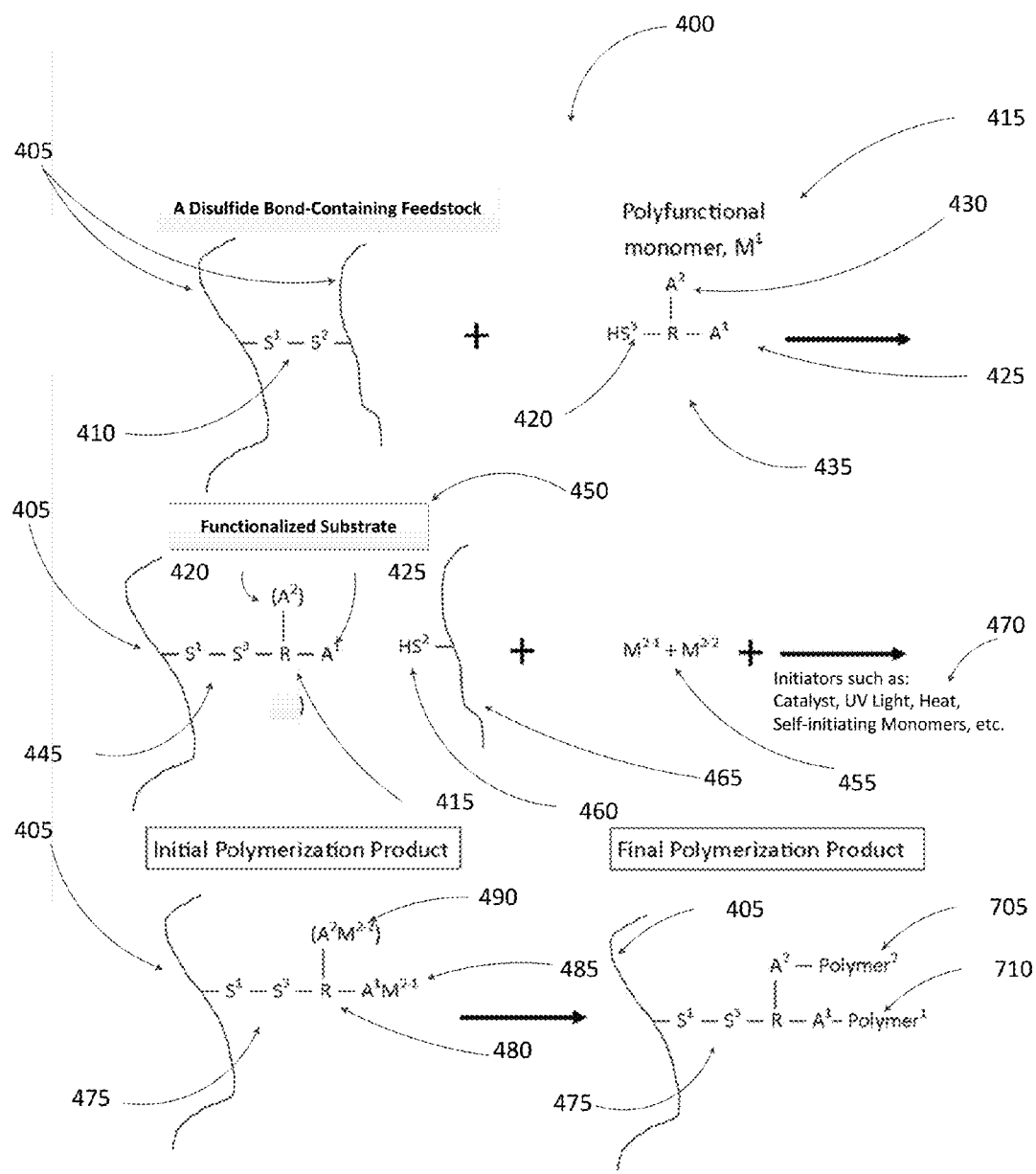
FIG. 4 is an illustration of an embodiment of a graft polymerization on a functionalized substrate utilizing different monomers $M^{2-1}$ and $M^{2-2}$ for the polymerization.

FIG. 4 illustrates an embodiment of the overview of a graft polymerization on a functionalized substrate 400. Disulfide bonds 410 are the bonds between two cysteine residues that are part of proteins, peptides or other materials containing disulfide bonds 405. To break the disulfide bond 410, at least one polyfunctional monomer $M^1$ 415 that includes at least one thiol group 420, one $A^1$ functional group 425 and optionally one $A^2$ functional group 430. Functional groups $A^1$ and $A^2$ may be any functional group, depending for example, on the target polymer(s) to be formed. Furthermore, multiple and different polyfunctional monomers $M^1$ 415 may be added as required dependent upon the polymer(s) to be produced.

Upon adding polyfunctional monomer(s) $M^1$ 415 to the segment of the protein, peptide or other material containing disulfide bonds 405 the initial reaction is the breaking of the disulfide bond 410 by the thiol 420 and reformation of the disulfide bond 445 on the segment 405 and formation of thiol 460 on the segment 465.

Monomers $M^{2-1}$ and $M^{2-2}$ 455 are added to the initial reaction product 450 wherein $M^{2-1}$ and $M^{2-2}$ may be polymerized at the same time or sequentially. As shown in FIG. 4, one of the initial propagation steps involves the addition of monomer $M^{2-1}$ to form moiety 485 with additional propagations steps leading to the formation of polymer$^1$ 710, while another of the initial propagation steps involves the addition of monomer $M^{2\text{-}2}$ to form moiety 490 with additional propagations steps leading to the formation of polymer² 705, Polymerization can be initiated by appropriate means such as, for example, heat, UV light, catalyst 470, etc. However, under appropriate conditions addition of monomers $M^{2\text{-}1}$ and/or $M^{2\text{-}2}$ can allow the polymerization reaction to occur eliminating the need for an initiator 470.

Figure 5:
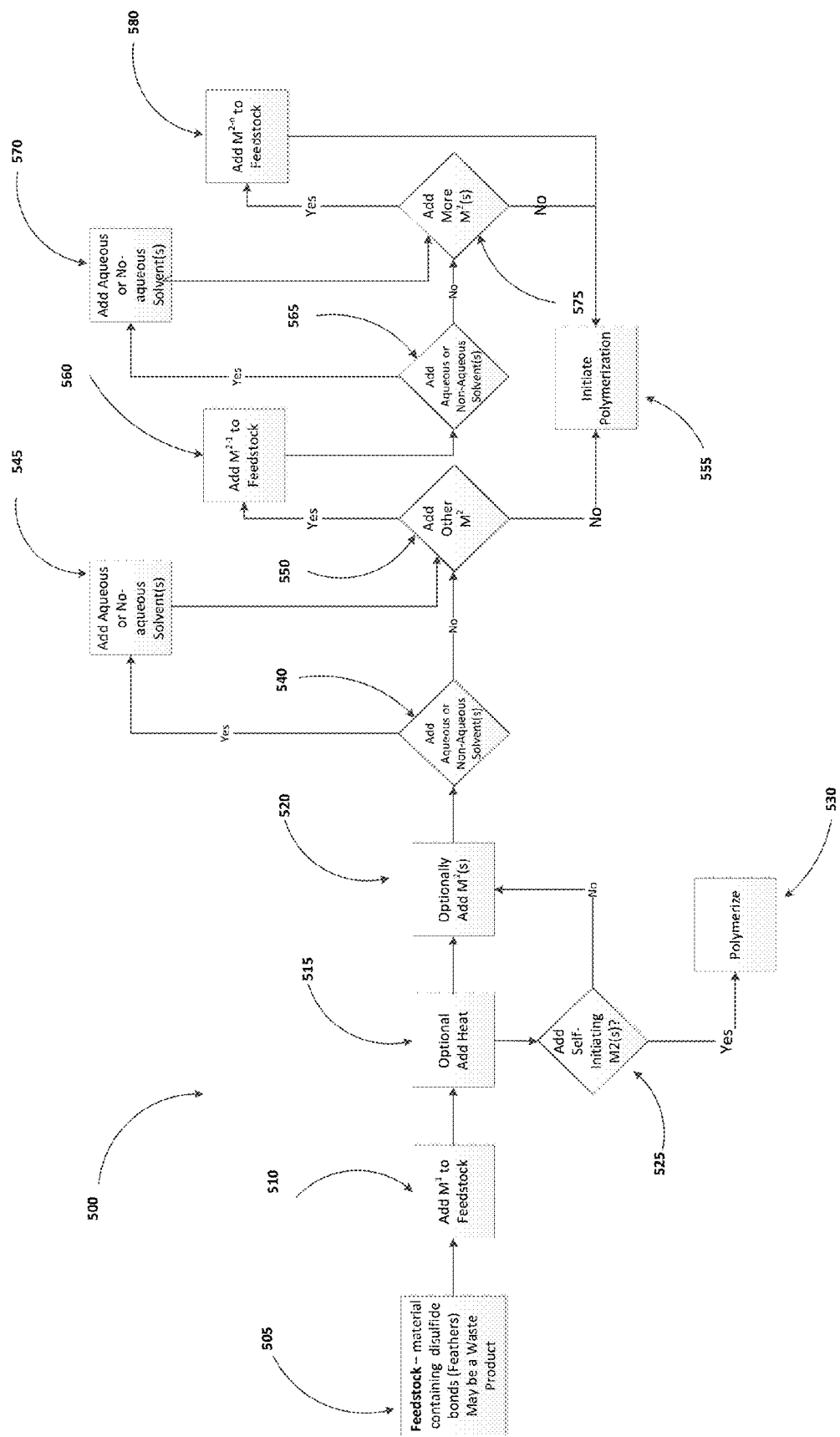
FIG. 5 is an illustration of one embodiment of the process flow of graft polymerization on a functionalized substrate.

FIG. 5 illustrates an embodiment of a flowchart 500 for graft polymerization on a functionalized substrate. It is understood that the steps in flowchart 500 can be performed sequentially or in parallel. It is also understood that in some embodiments, the steps in the flowchart 500 can be modified, moved, removed, replaced with additional steps and otherwise customized based on the type of graft polymerization to be performed. At 505, a feedstock containing disulfide bonds is provided. In some embodiments, the feedstock can be a waste product such as feathers. At 510, one or more polyfunctional monomer(s) $M^1$ 510 containing at least one disulfide bond breaking functional group (e.g., a thiol functional group) is added to a disulfide bond-containing feedstock 505 to create a functionalize substrate by breaking the disulfide bonds between the cysteine residues crosslinking the feedstock and reforming new disulfide bonds between one of the cysteine residues of the feedstock and the attacking thiol or other disulfide bond breading group. At 510, other $M^1$ polyfunctional monomer(s) can be added that may influence the $M^2$ monomers added at 515, 525, 560 and 575. Optionally, at 520, heat may be added to assist in breaking the disulfide bonds, and the dissolving and mixing of non-liquid monomers and functional groups. Dependent upon the polymer to be produced and without adverse effect on polymerization, at 525, monomer(s) $M^2$ may be added at the time the polyfunctional monomer(s) $M^1$ is added to the feedstock at 510. Alternatively, upon completion of the breaking of the disulfide bonds a self-initiating monomer(s) $M^2$ may be added at 525, at at which time polymerization is initiated at 530.

At 545 and 570, aqueous or non-aqueous solvents may be added as needed prior to initiating polymerization at 555 and accordingly, other $M^2$ monomers can be added at 560, 580 that are water or non water-soluble. Decisions of when to add $M^2$ monomers at 550 and 575 as well as decisions to add aqueous or non-aqueous solvents at 540, 565 are determined by the necessary process for the production of the polymer to be produced. Polymerization can be initiated at 555 when all required monomer(s) $M^1$ 510, and monomer(s) $M^2$ 515, 560, 570 have been added to the functionalized substrate. By example, initiation of polymerization 555 may be by the addition of heat, UV, or a catalyst.

Aspects:

It is noted that any of aspects 1-9 below can be combined with any of aspects 10-14.

1. A process of graft polymerization to generate a graft polymerization composition, comprising:
introducing a disulfide-bond-containing material to a polyfunctional monomer, the disulfide-bond-containing material including a disulfide bond connecting a first portion and a second portion, the polyfunctional monomer including at least one first functional group and at least one second functional group, the first functional group including a disulfide bond breaking material for breaking the disulfide bond and forming a second bond between the first portion and the polyfunctional monomer, the second functional group including a thiol group;

introducing an ene monomer to the disulfide-bond-containing material and a polyfunctional monomer to form a mixture; and
initiating a thiol-ene polymerization reaction of the mixture.

2. The process of aspect 1, wherein the disulfide bond breaking material includes a thiol group, and the second bond is a disulfide bond.

3. The process of aspects 1-2, further comprising:
initiating the thiol-ene polymerization reaction of the mixture using an initiator that includes at least one of a UV light, a thermal initiator, and/or a catalyst.

4. The process of aspects 1-3, further comprising initiating a second polymerization reaction to the graft polymerization composition.

5. The process of aspects 1-4, wherein the initiating the second polymerization reaction to the graft polymerization composition includes using an initiator that includes at least one of a UV light, a thermal initiator, and/or a catalyst.

6. The process of aspects 1-4, wherein the initiating the second polymerization reaction to the graft polymerization composition includes introducing a third monomer or macromer to the mixture, and self-initiating, via the third monomer or macromer, a second polymerization reaction.

7. The process of aspects 1-6, wherein the second functional group includes at least one ring, the ring being adapted to be opened to form at least a third functional group.

8. The process of aspects 2-7, wherein a molar ratio of the thiol groups and the ene monomer is not greater than 1:1.

9. The process of aspects 1-7, wherein the first and second portions connected by the disulfide bond are cysteine residues.

10. A graft polymer composition, the composition comprising:
a substrate and a thiol-ene polymer, the substrate and the thiol-ene polymer being bonded via a disulfide-bond;
the substrate including a disulfide-bond-containing material, the disulfide-bond-containing material including a disulfide bond connecting a first portion and a second portion; and
the thiol-ene polymer including a polyfunctional monomer and an ene monomer, the polyfunctional monomer including at least one first functional group and at least one second functional group, the first functional group including a disulfide bond breaking material, and the second functional group including a thiol group configured to react with the ene monomer.

11. The graft polymer composition of aspect 10, wherein the disulfide bond breaking material includes a thiol group.

12. The graft polymer composition of aspects 10-11, wherein the second functional group includes at least one of an acid anhydride, an acyl halide, an alcohol, an aldehyde, an alkene, an alkyne, an amine, a carboxylic acid, an ester and/or a thiol.

13. The graft polymer composition of aspects 10-12, wherein the second functional group includes at least one ring, the ring being adapted to be opened to form at least a third functional group.

14. The composition of aspects 11-13, wherein a molar ratio of the thiol groups and the ene monomer is not greater than 1:1.

With regard to the foregoing description, it is to be understood that changes may be made in detail, especially in matters of the construction materials employed and the shape, size and arrangement of the parts without departing from the scope of the present invention. It is intended that the specification and depicted embodiment to be considered exemplary only, with a true scope and spirit of the invention being indicated by the broad meaning of the claims.

The invention claimed is:

1. A grafted substrate comprising:
a substrate;
a polyfunctional monomer; and
a graft polymer grafted on the substrate via the polyfunctional monomer,
wherein the polyfunctional monomer is chemically bonded to the substrate and the polymer,
wherein the graft polymer is formed using a condensation polymerization reaction, and
wherein the polyfunctional monomer is bonded to the substrate via a disulfide bond.

2. The grafted substrate of claim 1, wherein the polyfunctional monomer is bonded to the polymer via a sulfur-carbon bond.

3. The grafted substrate of claim 1, wherein the substrate includes cysteine or cysteine-containing material.

4. The grafted substrate of claim 1, wherein the polyfunctional monomer includes a functional group, the functional group includes at least one of an acid anhydride, an isothiocyanate, an acyl halide, an alcohol, an aldehyde, an alkene, an alkyne, an amine, a carboxylic acid, an ester and/or a thiol.

5. The grafted substrate of claim 1, wherein the polyfunctional monomer includes a functional group, the functional group includes at least one ring, the ring being adapted to be opened to form at least a second functional group.

6. The grafted substrate of claim 1, further comprising a polyester polymer,
wherein the polyester polymer is bonded to the polyfunctional monomer via an ester bond.

7. A functionalized substrate and graft polymer combination comprising:
a substrate; and
a polyfunctional monomer,
wherein the polyfunctional monomer including at least one first functional group and at least one second functional group, the first functional group including a first thiol group, and the second functional group including a second thiol group configured to react with a condensation polymerizable monomer, the first thiol group forming a disulfide bond with the substrate,
wherein the graft polymer is formed using a condensation polymerization reaction.

8. The functionalized substrate and graft polymer combination of claim 7, wherein the polyfunctional group includes a third functional group, the third functional group includes at least one of an acid anhydride, an acyl halide, an isothiocyanate, an alcohol, an aldehyde, an alkene, an alkyne, an amine, a carboxylic acid, an ester and/or a thiol.

9. The functional substrate of claim 7, wherein the polyfunctional group includes a third functional group, the third functional group includes at least one ring, the ring being adapted to be opened to form at least a fourth functional group.

* * * * *